United States Patent Office 2,755,272
Patented July 17, 1956

2,755,272

NATURAL AND SYNTHETIC RUBBER CONTAINING AS ANTIOXIDANTS DI(HYDROXY-3,5-HYDROCARBON - SUBSTITUTED - PHENYL)METHANE AND ITS SALTS

Arthur Lambert and Boris N. Leyland, Blackley, Manchester, England, assignors to Imperial Chemical Industries Limited, a corporation of Great Britain No Drawing. Application March 2, 1953,
Serial No. 339,932

Claims priority, application Great Britain March 11, 1952

8 Claims. (Cl. 260—45.95)

This invention relates to improvements in the manufacture of age-resistant natural and synthetic rubbers and rubber articles, and stabilised synthetic rubber latices.

We have found that 2:2'-dihydroxy-5:5'-dimethyl-diphenylmethanes, to the 3 position of which there is attached the tertiary carbon atom of a tertiary alkyl group of 4–8 carbon atoms, and to the 3' position a cyclohexyl, bornyl, isobornyl or non-tertiary alkyl group of 1–5 carbon atoms, are very valuable antioxidants for natural and synthetic rubbers.

The above mentioned compounds are new and they are made according to the processes which are described in co-pending application No. 339,931, filed March 2, 1953, now Patent No. 2,732,406.

We have also found that the normal and basic aluminum, barium, calcium, magnesium, strontium, and zinc salts of the above new compounds are likewise valuable antioxidants for natural and synthetic rubbers.

These salts, which are themselves new, may be made from the above new compounds according to known methods of salt formation.

Both the new compounds and their salts have not only excellent preservative properties in rubber but are unexcelled in non-staining properties and also have excellent physical properties which make them well adapted for use in the mechanical processes employed in manufacturing rubber articles. They are also well adapted for addition to latices of both natural and synthetic rubber and for stabilising the latter. They are also eminently suitable for use in the manufacture of cellular and sponge articles from natural and synthetic rubbers.

The antioxidants are employed in the manufacture of rubber and rubber articles according to the usual methods. Thus they may for example be mixed with the rubber along with vulcanising and other ingredients and the resulting mixes then cured either at ambient temperature or by heat treatment, or they may be mixed with rubber along with other compounding ingredients and the mixture vulcanised by treatment with sulphur monochloride in the cold. The antioxidants are effective in proportions of from about ¼ to 2 percent of the weight of the rubber.

The synthetic rubbers which may be used include for example polymers and butadiene-1:3 and 2-chlorobutadiene-1:3 and copolymers of either of these compounds with acrylonitrile, styrene, methyl methacrylate and other well known polymerisable compounds which are used in the manufacture of these rubbers.

The following examples in which parts are by weight illustrate but do not limit the invention:

Example 1

Vulcanisable rubber stocks of the following compositions were prepared by the usual process of mixing, using as the antioxidant 2:2'-dihydroxy-3-tert-butyl-3':5:5'-trimethyldiphenylmethane and also using no antioxidant.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Sulphur | 3 | 3 |
| Diphenylguanidine | 0.5 | 0.5 |
| Antioxidant | | 1 |

A sheet of each mix was cured for 75 minutes at 141° C. and ageing tests were carried out on the vulcanisates. The results of the ageing tests were as follows:

| | Tensile Strength (kg./sq. cm.²) | |
|---|---|---|
| | A | B |
| Unaged | 177 | 160 |
| Aged in bomb at 70° C. and 300 lb. per sq. in. oxygen pressure for 8 days | Perished | 94 |
| Aged in bomb at 70° C. and 300 lb. per sq. in. oxygen pressure for 12 days | do | 70 |

To show the non-staining properties of the antioxidants, vulcanisable rubber stocks of the following compositions were prepared by the usual process of mixing, using the antioxidant mentioned above and also no antioxidant.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| Antioxidant | | 1 |

A sheet of each mix was cured for 12 minutes at 125° C. Samples of the vulcanised sheets were exposed outdoors with the following result:

| | A | B |
|---|---|---|
| Stain after exposure outdoors for 8 days | Pale cream | Cream |

Example 2

Vulcanisable rubber stocks of the following compositions were prepared by the usual process of mixing, using as the antioxidant 2:2'-dihydroxy-3-tert-butyl-3'-sec-butyl-5:5'-dimethyl-diphenylmethane (mix B) and also using no antioxidant (mix A).

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| Antioxidant | | 1 |

A sheet of each mix was cured for 12 minutes at 125° C. and ageing tests were carried out on the vulcanisates;

staining was also examined by exposure outdoors. The results of the ageing tests were as follows:

| | Tensile Strength (kg./cm.²) | |
|---|---|---|
| | A | B |
| Unaged | 189 | 184. |
| Aged in bomb at 70° C. and 300 lb./in.² oxygen pressure for: | | |
| 8 days | Perished | 146. |
| 12 days | do | 107. |
| 16 days | do | 81. |
| Colour after 12 weeks' exposure outdoors | Very pale cream. | Pale cream. |

Example 3

Identical with Example 2 but the antioxidants used were 2:2' - dihydroxy - 3 - (1:1:3:3 - tetramethylbutyl)- 3':5:5'-trimethyldiphenylmethane (mix C) the condensation product of n-butaldehyde with a mixture of 2 parts of 2:4-dimethylphenol and 1 part of 2:5-dimethylphenol, which is a commercial antioxidant of powerful antioxidant action and excellent non-staining characteristics (mix X) and also no antioxidant (mix A).

| Results | Tensile Strength (kg./cm.²) | | |
|---|---|---|---|
| | A | X | C |
| Unaged | 189 | 179 | 187. |
| Aged in bomb at 70° C. and 300 lb./in.² oxygen pressure for: | | | |
| 8 days | Perished | 151 | 161. |
| 12 days | do | 113 | 140. |
| 16 days | do | 92 | 115. |
| Colour after 12 weeks' exposure outdoors. | Very pale cream. | Pale cream | Very pale cream. |

Example 4

Identical with Examples 2 and 3 but the antioxidants used were 2:2' - dihydroxy - 3 - tert - butyl - 3' - isobornyl- 5:5'-dimethyldiphenylmethane (mix D), the antioxidant used in mix X in Example 3 (mix X) and also no antioxidant (mix A).

| Results | Tensile Strength (kg./cm.²) | | |
|---|---|---|---|
| | A | X | D |
| Unaged | 189 | 179 | 200. |
| Aged in bomb at 70° C. and 300 lb/in.² oxygen pressure for: | | | |
| 8 days | Perished | 151 | 165. |
| 12 days | do | 113 | 146. |
| 16 days | do | 92 | 130. |
| Colour after 12 weeks' exposure outdoors. | Very pale cream. | | Very pale cream. |

Example 5

Identical with Examples 2–4 but antioxidant used was the magnesium salt of 2:2' - dihydroxy - 3 - tert - butyl- 3':5:5' - trimethyldiphenylmethane (mix E).

| Results | Tensile Strength (kg./cm.²) | |
|---|---|---|
| | A | E |
| Unaged | 189 | 166. |
| Aged in bomb at 70° C. and 300 lb./in.² oxygen pressure for: | | |
| 8 days | Perished | 152. |
| 12 days | do | 130. |
| 16 days | do | 121. |
| Colour after 12 weeks' exposure outdoors | Very pale cream. | Pale cream. |

Example 6

Identical with Examples 2–5 but the antioxidant used was 2:2' - dihydroxy - 3 - tert-butyl - 3':5:5' - trimethyldiphenylmethane (mix F).

| Results | Tensile Strength (kg./cm.²) | |
|---|---|---|
| | A | F |
| Unaged | 189 | 175. |
| Aged in bomb at 70° C. and 300 lb./in.² oxygen pressure for: | | |
| 8 days | Perished | 165. |
| 12 days | do | 151. |
| 16 days | do | 130. |

Example 7

Identical with Examples 2–6 but the antioxidant used was 2:2' - dihydroxy - 3 - tert - butyl - 3' - cyclohexyl- 5:5' - dimethyldiphenylmethane (mix H) and also no antioxidant (mix G).

| Results | Tensile Strength (kg./cm.²) | |
|---|---|---|
| | G | H |
| Unaged | 226 | 210. |
| Aged in bomb at 70° C. and 300 lb./in.² oxygen pressure for: | | |
| 8 days | Perished | 169. |
| 16 days | do | 119. |
| Colour after 12 weeks' exposure outdoors | Pale cream. | Cream. |

Example 8

A vulcanisable rubber stock of the following composition was prepared by a process of mixing usual for such compounds, using as the antioxidant 2:2' - dihydroxy - 3 - tert - butyl - 3':5:5' - trimethyldiphenylmethane.

| | |
|---|---|
| Pale crepe natural rubber (premasticated for 30 minutes on cold rolls) | 100 |
| Zinc oxide | 20 |
| Lithopone | 20 |
| Light magnesium carbonate | 30 |
| Petroleum jelly | 12 |
| Stearic acid | 5 |
| Sulphur | 2.5 |
| Tetramethylthiuram monosulphide | 0.75 |
| Antioxidant | 1 |
| Dinitrosopentamethylene tetramine blowing agent | 1 |

The compound was sheeted off to a thickness of ¼ inch and press cured in a ⅜ inch thick mould for 10 minutes at 141° C. The resultant product was well adapted for use as a light coloured sponge sole for footwear.

Example 9

A vulcanisable rubber stock of the following composition was prepared by a process of mixing usual for such compounds, using as the antioxidant 2:2'-di-hydroxy-3- (1:1:3:3 - tetramethylbutyl) - 3':5:5' - trimethyldiphenylmethane.

| | |
|---|---|
| Pale crepe natural rubber (premasticated on cold rolls for 30 minutes) | 50 |
| A blend of a butadiene/styrene copolymer in the ratio 75/25, with a butadiene/styrene copolymer in the ratio 25/75 to give an overall butadiene/styrene ratio of 50:50 | 50 |
| Petroleum jelly | 10 |
| Paraffin wax | 2 |
| Stearic acid | 4 |
| Calcium silicate | 60 |
| China clay | 30 |
| Purified wood cellulose (warmed to 100° C. in an oven and incorporated hot) | 15 |
| Zinc oxide | 4 |

| Ingredient | Amount |
|---|---|
| Titanium dioxide | 5 |
| Dinitrosopentamethylene tetramine | 3.5 |
| Sulphur | 2.5 |
| Antioxidant | 1 |
| A blend of dibenzthiazyl disulphide and diphenylguanidine | 1.5 |
| Oleic acid | 1 |

The mix was sheeted off to uniform thickness, and a mould then fully loaded with the mix and cured in a press for 20 minutes at 141° C. On opening the mould after completion of cure, expansion of the rubber took place, giving a microcellular product well suited for use as a lightweight soling material for footwear.

What we claim is:

1. A composition comprising a rubbery polymer selected from the group consisting of natural rubber, polymers of butadiene and polymers of chlorobutadiene having incorporated therein at least one antioxidant selected from the group consisting of 2:2'-dihydroxy-3-tert-butyl-3':5:5' - trimethyl - diphenylmethane, 2:2' - dihydroxy - 3-tert-butyl-3' - sec - butyl - 5:5' - dimethyldiphenylmethane, 2:2'-dihydroxy - 3 - (1:1:3:3 - tetramethylbutyl) - 3':5:5'-trimethyldiphenylmethane, 2:2'-dihydroxy-3 - tert - butyl-3'-isobornyl - 5:5' - dimethyldiphenylmethane, 2:2' - dihydroxy-3-tert-butyl-3'-cyclohexyl - 5:5' - dimethyldiphenylmethane, and the basic and normal aluminum, barium, calcium, magnesium, strontium and zinc salts of such methanes.

2. A composition comprising a rubbery copolymer of butadiene and an ethylenically unsaturated monomer copolymerizable therewith having incorporated therein at least one of the antioxidants of claim 1.

3. A stabilized composition as claimed in claim 1 and comprising natural rubber having incorporated therein at least one of said antioxidants.

4. A stabilized composition as claimed in claim 1 and comprising a synthetic-rubber latex having incorporated therein at least one of said antioxidants.

5. A composition as claimed in claim 1 wherein the antioxidant is 2:2' - dihydroxy - 3 - tert - butyl - 3':5:5'-trimethyldiphenylmethane.

6. A composition as claimed in claim 1 wherein the antioxidant is 2:2' - dihydroxy - 3 - (1:1:3:3 - tetramethylbutyl) - 3':5:5' - trimethyldiphenylmethane.

7. A composition as claimed in claim 1 wherein the antioxidant is 2:2' - dihydroxy - 3 - tert - butyl - 3' - isobornyl - 5:5' - dimethyldiphenylmethane.

8. A composition as claimed in claim 1 containing from ¼ to 2% on the weight of said material of said diphenylmethanes.

References Cited in the file of this patent

UNITED STATES PATENTS

| | | |
|---|---|---|
| 2,570,402 | Stevens et al. | Oct. 9, 1951 |
| 2,628,953 | Newby | Feb. 17, 1953 |